A. CALLESON.
MACHINE FOR MAKING ARTICLES OF SHEET METAL.
APPLICATION FILED MAR. 22, 1919.
1,345,664.
Patented July 6, 1920.
8 SHEETS—SHEET 2.
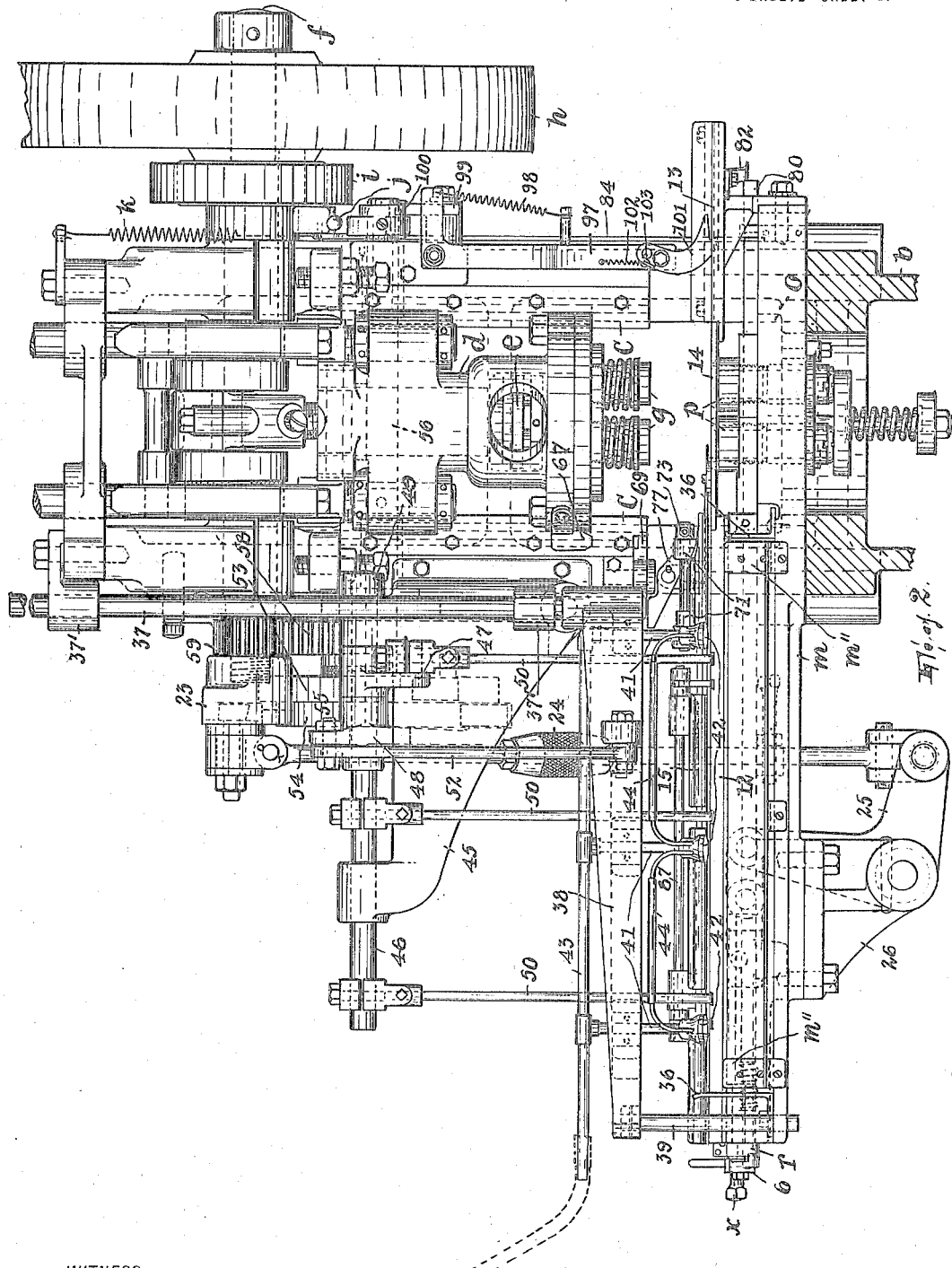

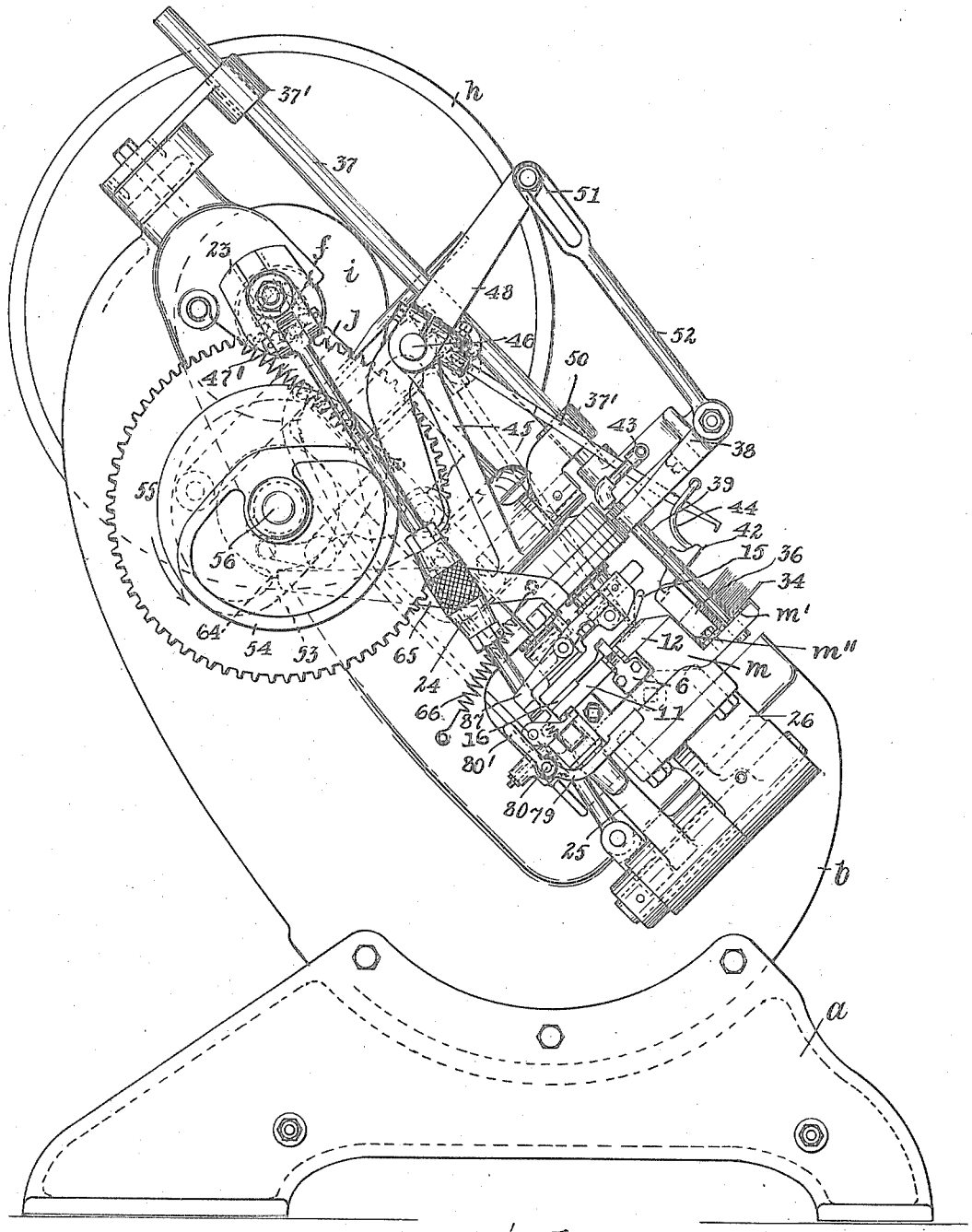

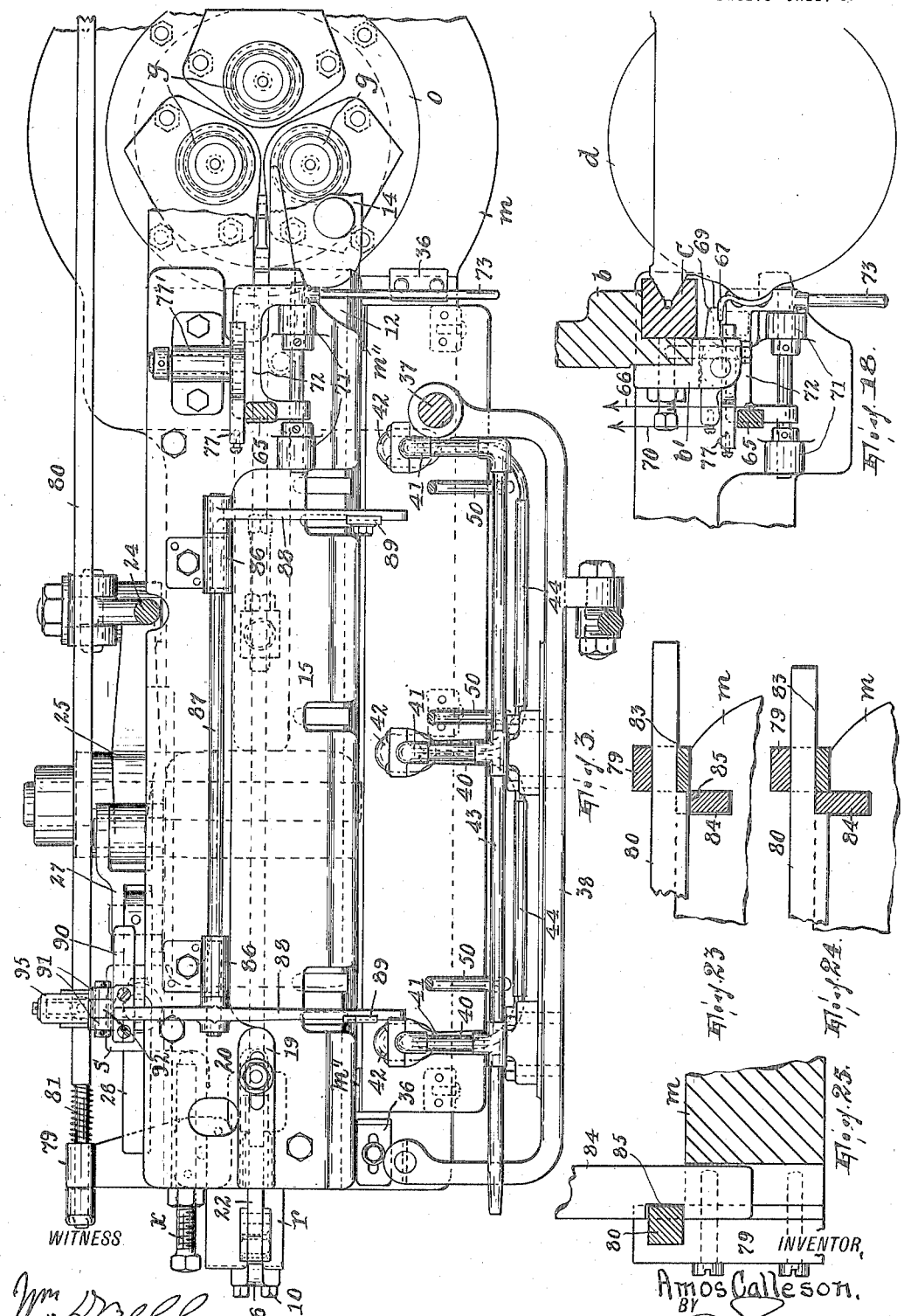

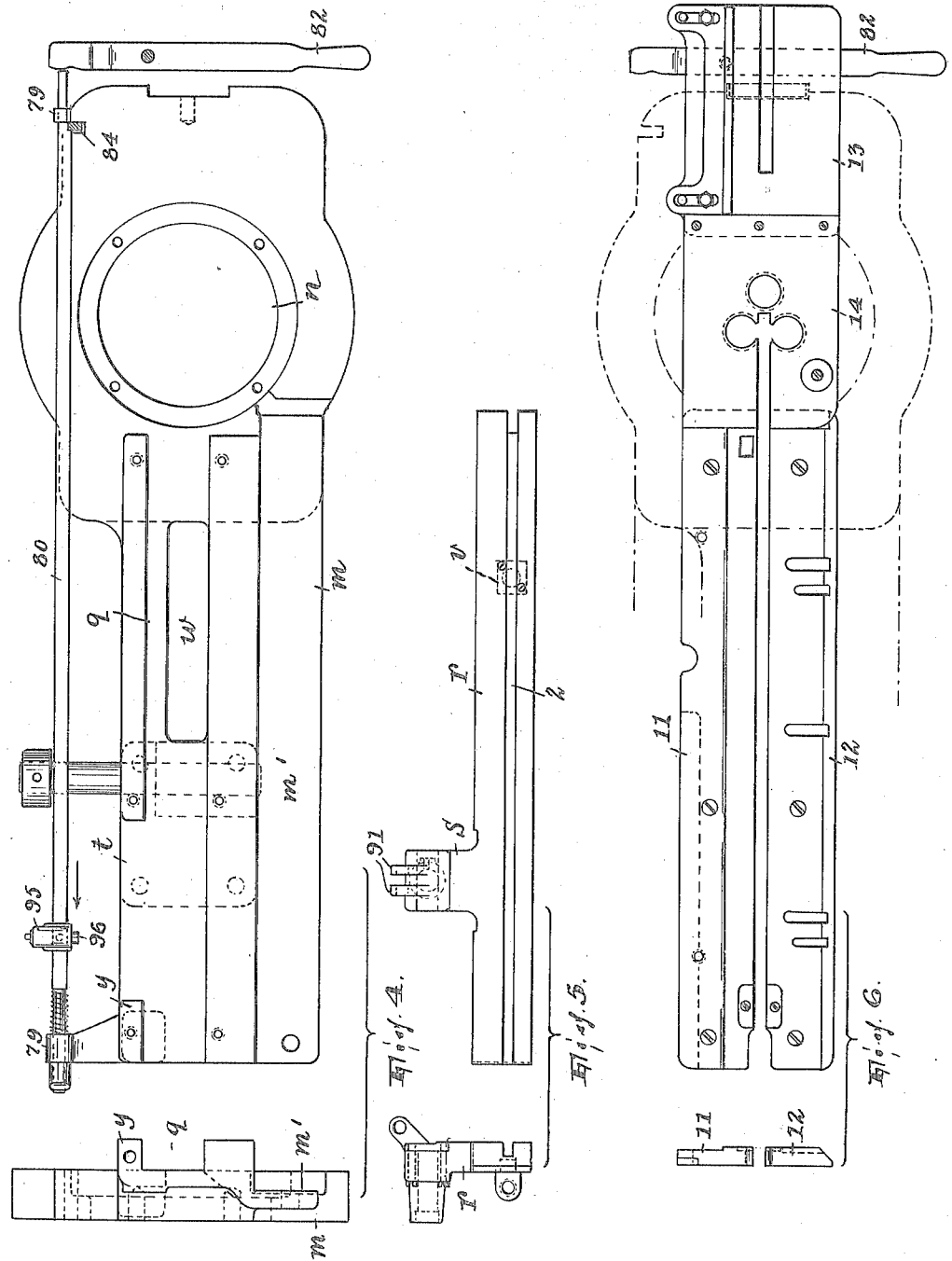

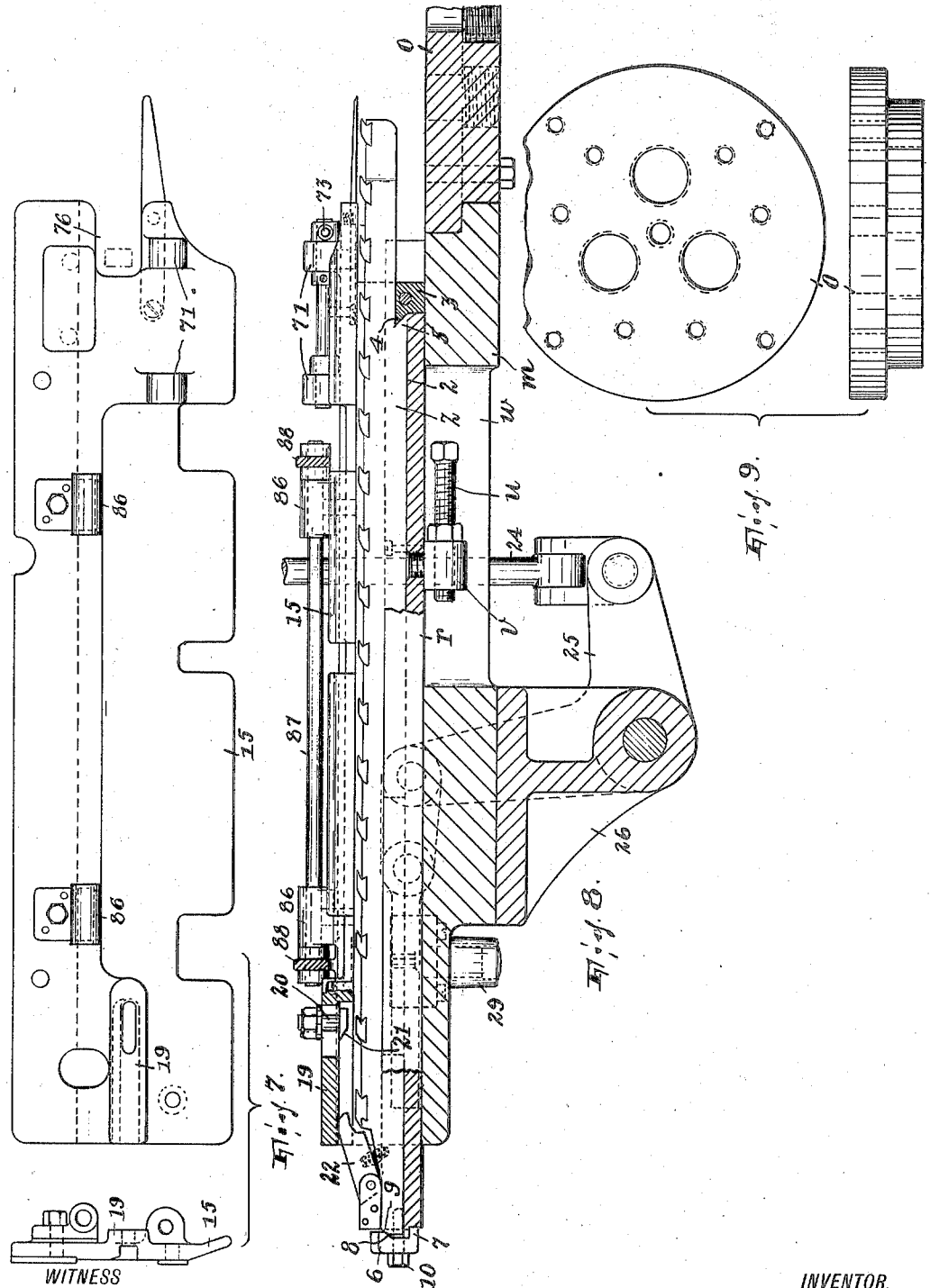

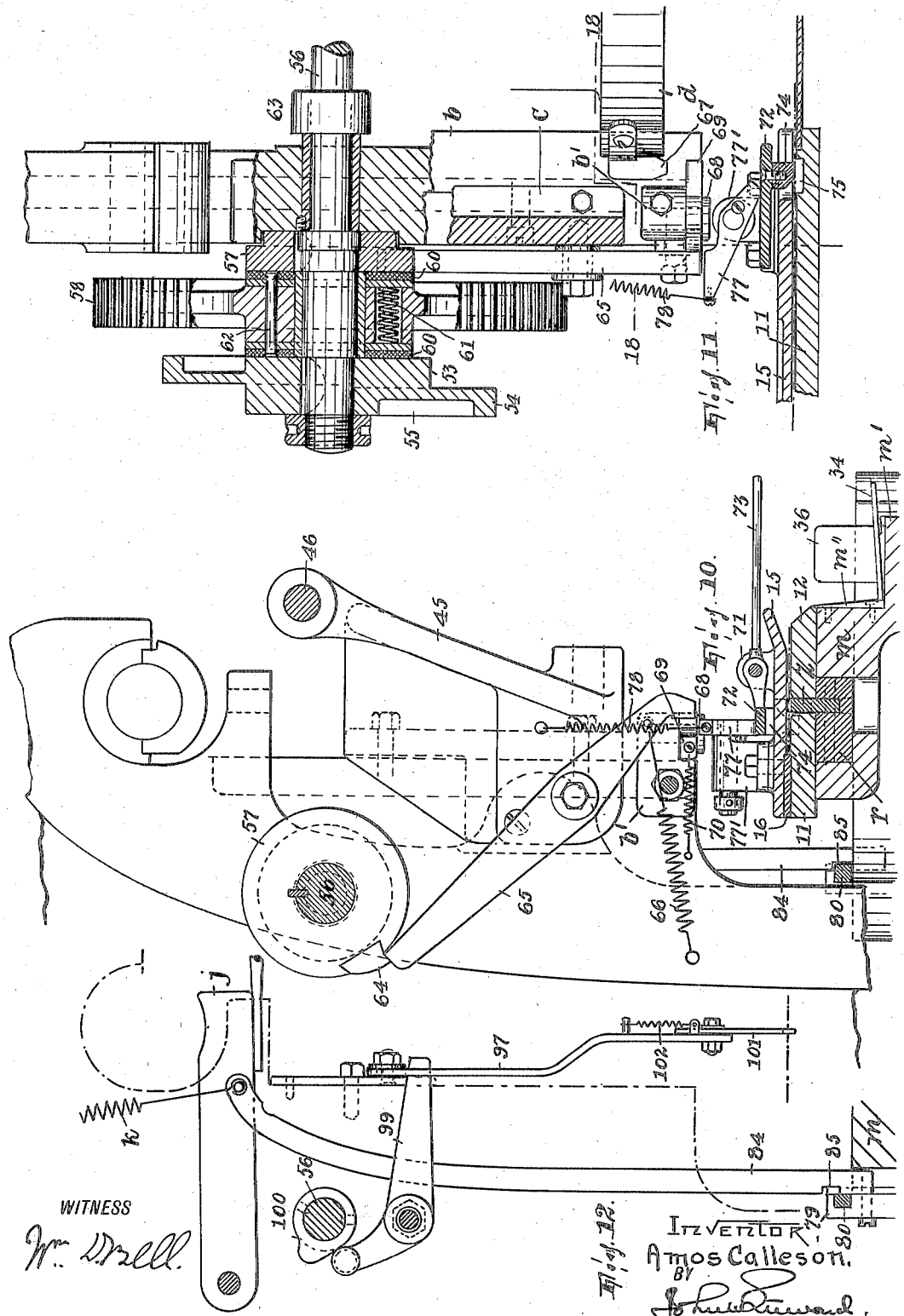

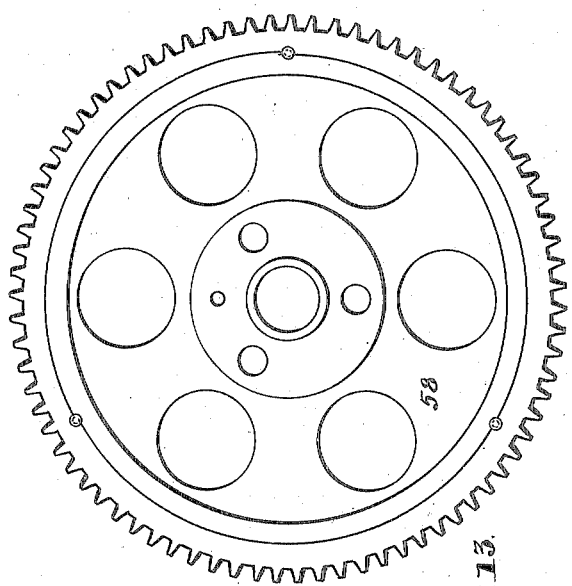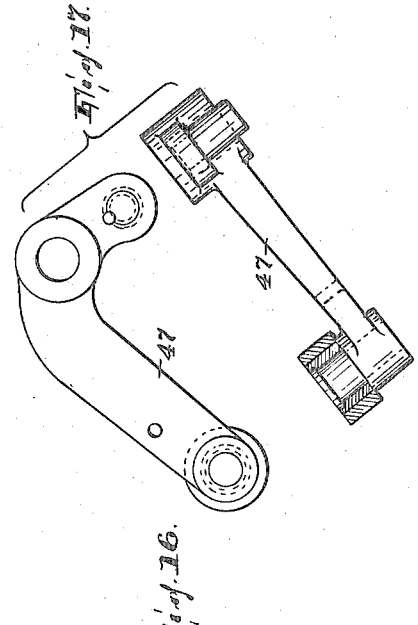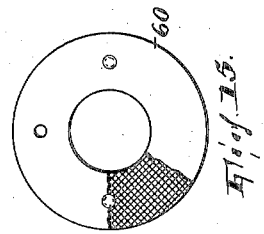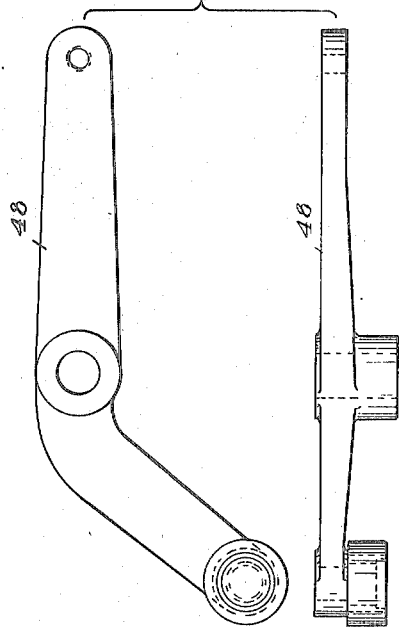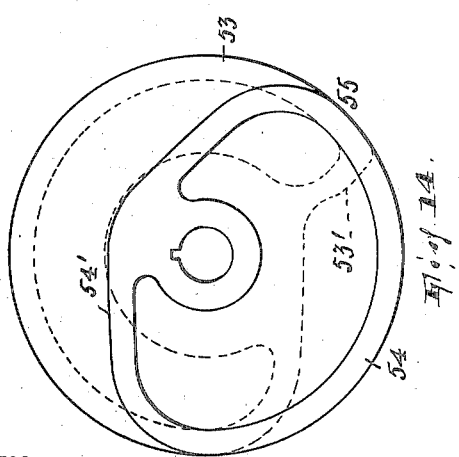

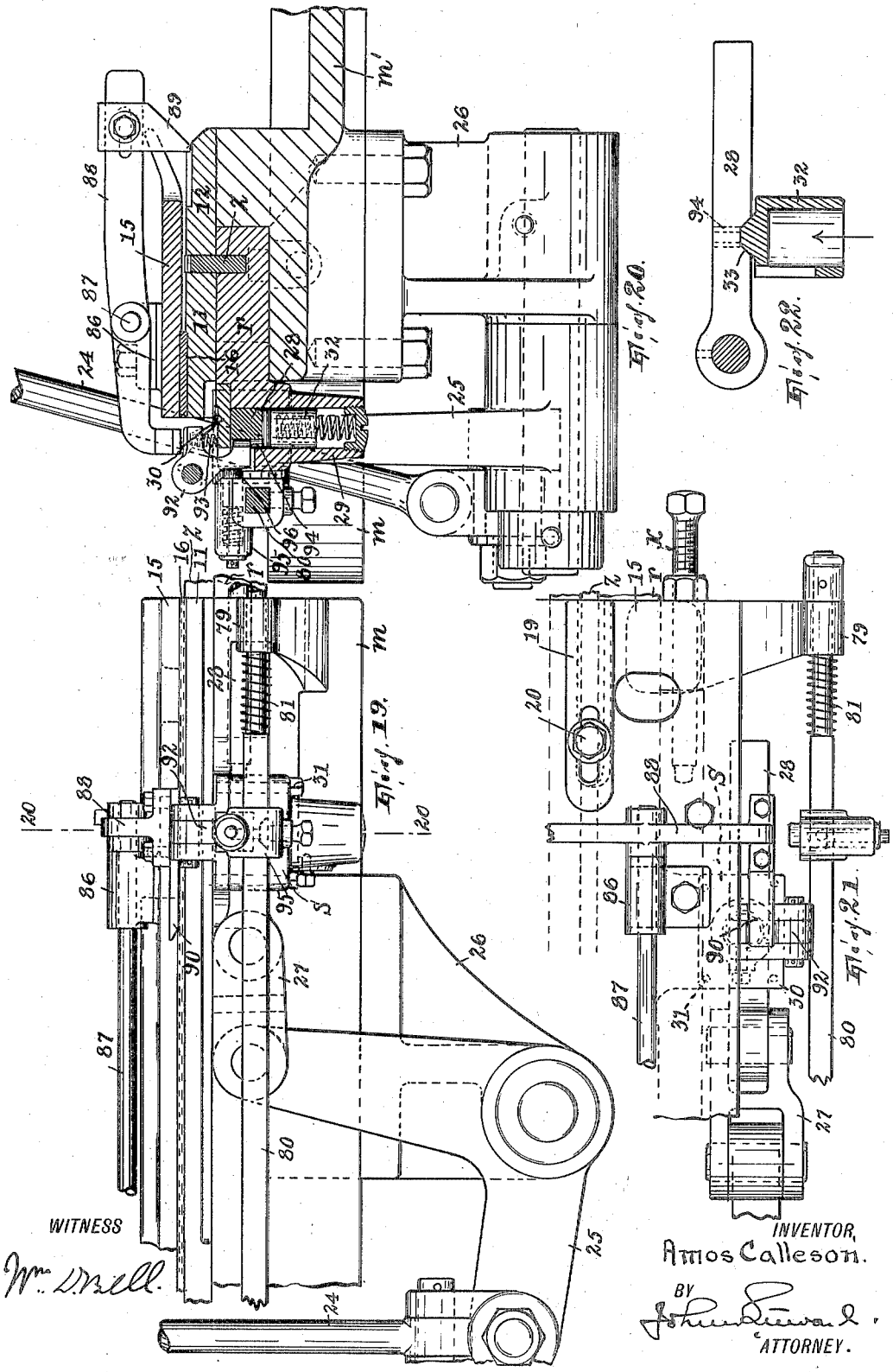

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

MACHINE FOR MAKING ARTICLES OF SHEET METAL.

1,345,664.             Specification of Letters Patent.         Patented July 6, 1920.

Application filed March 22, 1919. Serial No. 284,449.

*To all whom it may concern:*

Be it known that I, AMOS CALLESON, a citizen of the United States, residing at Brooklyn, in the county of Kings and State of New York, have invented certain new and useful Improvements in Machines for Making Articles of Sheet Metal, of which the following is a specification.

This invention relates to machines for making articles from metal sheets, as by punching them out and forming them by means of dies, and it consists in certain improvements in such machines designed to increase their efficiency and make their operation less dependent on the skill and attention of the operator, the improvements being especially directed to the mechanism for feeding the sheets to the means for operating thereon and to the mechanism for stopping the machine, particularly in case a jam or some other irregular condition arises, and also to the forming means, which according to the present invention is designed to make the machine serviceable as a jobbing press, *i. e.*, so that by readily effected changes products of different sizes or spacings may be turned out.

In the accompanying drawings,

Figure 1 is a side elevation of the machine;

Fig. 2 is a front elevation, partly in section;

Fig. 3 is a plan, partly in section, mainly of the mechanism lateral of the dies;

Fig. 4 shows in plan and end elevation the table, certain parts of the stopping mechanism appearing in the plan view;

Fig. 5 is a plan and end elevation of the rack-carrying slide;

Fig. 6 is a plan of certain plates 11, 12, 13 and 14 which cover the table, this figure also showing an end elevation of the plates 11, 12;

Fig. 7 is a plan and end elevation of a plate 15 which surmounts the plates 11, 12 and forms therewith the sheet receiver;

Fig. 8 is a vertical sectional view of the mechanism lateral of the dies, the plane of the section being just forward of the rack and parallel therewith;

Fig. 9 is a plan and elevation of the bed for the lower die group;

Figs. 10 and 11 are side and front elevations illustrating parts appertaining to the sheet feeding means;

Fig. 12 is a side elevation of the means for ejecting the scrap and parts of the stopping means;

Figs. 13, 14 and 15 are elevations of a certain gear 58, cam wheel 55 and friction disk 60;

Figs. 16 and 17 show in side elevation and plan two levers included in said sheet feeding means;

Fig. 18 is a sectional view on line 18—18, Fig. 11;

Figs. 19 and 21 are a rear elevation and a plan of a fragment of the machine, illustrating particularly the stopping mechanism;

Fig. 20 is a sectional view on substantially the line 20—20, Fig. 19;

Fig. 22 is a detail illustrating the slipgrip connection between the rack-carrying slide and its actuating means;

Figs. 23 and 24 are detail views, in plan, partly in section, showing certain parts 80 and 84 of said stopping mechanism in two different positions;

Fig. 25 is a side elevation, partly in section, of what is shown in Figs. 23 and 24.

On the base $a$ is arranged the tilted-back frame $b$ provided with slideways $c$ for the plunger $d$ in which is arranged to slide another plunger $e$, the two plungers being connected with the main shaft $f$ by any well known means so as to be reciprocated and carrying the upper die mechanism $g$, $h$ designates a going driving member, as a pulley, journaled on the shaft $f$, and $i$ a suitable form of clutch for disconnectively connecting said shaft and member together, $j$ (Figs. 1, 2 and 12) being a control lever which is normally uplifted by a spring $k$ into position to disestablish the clutch and adapted to be depressed by hand to establish the clutch.

On the frame $b$ is bolted the table $m$ (Fig. 4) the same standing at a backward incline and projecting to the left of the frame as viewed from the front. Under the plungers $d$ $e$ the table is formed with a rabbeted opening $n$ to receive the circular bed $o$ (Figs. 3, 8 and 9) for the lower die mechanism generally designated by the character $p$, the bed $o$ being rabbetted to fit opening $n$ and having its top surface substantially flush with that of the table. The table has upstanding portions forming a guideway or groove $q$ extending laterally from the die mechanism, and this groove receives the reciprocating rack-carrying slide *r* formed with a rearwardly projecting arm *s* which plays in a break *t* formed in the rearward one of said groove-forming portions, (Figs. 3 and 4). The right hand limit of movement of the slide is determined by contact of a set screw *u*, arranged in a depending part *v* of the slide, with the end of the slot *w* in the table in which the set screw plays—Figs. 4 and 8; its left hand limit of motion is determined by contact of the arm *s* with a set screw *x* tapped into a suitable part *y* of the table—Figs. 3, 4 and 21. The rack *z* is a bar having suitable teeth along its upper edge and set in a longitudinal groove 2 in the slide *r*. It is secured to the slide at one end by a block 3 pinned in the slide and having a beveled overhang 4 which impinges a beveled projection 5 of the rack bar, and at the other end by a clamp 6 formed with a foot 7 to bear against the end of the slide and with a bevel 8 to impinge the bevel 9 on the rack, the clamp being bound to the slide by a set-screw 10 on tightening which the rack bar is obviously firmly held against the floor of groove 2 by the coaction of the bevels. The slide is covered by the plates 11, 12 suitably secured thereon and spaced for the reception between them of the rack teeth, plate 12 having its forward edge beveled downward. These plates and a plate 13 at the right hand side of the die bed *o* are bridged by a plate 14 (suitably apertured to receive the rack and upper dies) which is set into them so that the tops of all are flush, forming a plane surface over which the sheets to be operated upon are advanced. Secured above the plates 11, 12 is a plate 15 which is made to form a space therewith by a spacer plate 16 (Fig. 20) interposed between plates 11 and 15 at the back, plate 15 having its forward edge upturned; a receiver having a flaring frontal entrance or mouth and closed at the back is thus formed into which the sheets may be one by one introduced edgewise, to be thereupon advanced by the rack to the dies.

It will be understood that the rack advances the sheet fed into the receiver step by step, each increment of advance being followed by descent of the plungers and consequent coaction of the dies to form the product, and to shape the tail end of the sheet for successive engagement by the rack teeth the following instrumentalities are employed: An elongated housing 19 is formed on table *m* over the tail end of the rack and has a longitudinal slot receiving, adjustable therein, a bolt 20 whose head forms at the under side of the housing a cam 21 directly over the rack. A pawl or rack-tooth 22 is pivoted in the tail of the rack and normally held elevated by a suitable spring. When a sheet has been placed in the receiver and the rack makes its first movement to the right this pivoted rack tooth catches over its left-hand edge and as it advances the sheet is depressed by the cam 21, so that the engaged part of the sheet is bent downward into the groove between the plates 11 and 12, thus forming a crimp or bend in the sheet with which the fixed teeth of the rack may successively engage to advance the sheet step by step. The rack carrying slide *r* is reciprocated, performing its sheet-advancing or right hand thrusts in alternation with the punching out and forming operations of the die mechanism, from a crank 23 on the shaft *f* through the medium of a pitman 24 connecting said crank with a bell crank lever 25 fulcrumed in a bracket 26 depending from the table *m*, said crank being connected by a link 27 with a bar 28 which has a slip grip connection with the slide *r* as follows: The arm *s* of the slide has a depending socket 29 having a cap 30 secured thereto by screws 31 and penetrated by the bar 28 which is held against the cap 30 by a spring pressed plunger 32 in the socket, the plunger being tapered and normally engaged in a tapered notch 33 in the bar. (Figs. 19 to 22). As will appear, if the slide should jam the slip grip connection between the bar and the grip formed by the socket and its spring pressed plunger will yield.

A holder for the stack of sheets to be fed one after another into the receiver is provided on a projecting ledge *m'* at the front of table *m* by a plate 34, the sheets resting with their back edges against back gages *m''* of the table and between two gages 36. A plunger, consisting of a shaft 37 movable in brackets 37' and a laterally projecting head 38 attached to the lower end of said shaft and having a guiding stud 39 sliding in the table, is arranged (relatively) over this holder, being movable toward and from the same, and in arms 40 projecting inwardly from this head at regular intervals are clamped the tubular stems 41 of the suction cups 42, said stems being all connected to a pipe 43 which may in turn be connected, as by flexible tubing, with a suitable pump or other exhausting means. When the suction device thus formed moves down and back the suction cups are designed to pick up and elevate the topmost sheet in the stack to a plane about opposite the mouth of the receiver formed by the plates 11—12 and 15, and in order to insure against the sheet being thus picked up unless it is in fairly squared relation to the back gages *m''* (and hence to the suction cups which are in a line parallel to said back gages) they are connected by tubing 44, whereby if the position is sufficiently bad so that the suction fails as to one suction cup it will fail as to all and the sheet will not be lifted. A bracket 45 projects laterally from the frame $b$ and in this is journaled a horizontal rock shaft 46. This shaft has fixed thereon a bell-crank lever 47 and fulcrumed thereon a bell-crank lever 48, being kept from endwise movement by the lever 47 and a collar 49 abutting opposite faces of a part of the bracket. The shaft and one arm of the lever 47 have suitably clamped thereto downwardly projecting arms 50, all in the same plane; these arms project far enough downwardly so that when a sheet has been elevated into a position opposite the receiver mouth as above explained, the group of arms on being caused to swing inward will push the sheet off the faces of the suction cups to which it adheres and into the receiver. One arm of the lever 48 has a slot-and-pin connection 51 with a link 52 connected to the aforesaid plunger head 38; the slot-and-pin connection is obviously present to allow the required lost motion between the lever, whose range of movement is fixed, and the plunger, the limit of whose downward movement depends upon the height of the stack. The free or inner arms of the levers (or rollers thereon) bear against peripheral camways 53 and 54, respectively, of a cam wheel 55 keyed on a countershaft 56 journaled in frame $b$ parallel with shaft $f$ and having also keyed thereon a stop collar 57 spaced from the cams. The weight of the suction device holds lever 48 against its cam; a spring 47' may be employed to hold lever 47 against its cam. A gear wheel 58, in mesh with a pinion 59 on shaft $f$, is journaled on shaft 56 and between each face of it and the adjoining cam or stop collar is a friction disk 60, the friction disks being pressed apart against the cam and stop collar by spiral springs 61 housed in the gear and being held by pins 62 to rotate with the gear. Shaft 56 is held against longitudinal movement by the stop collar 57 and a collar 63 abutting opposite sides of the frame $b$.

A toe or stop 64 on the stop collar is normally (i. e. while the rack is advancing a sheet) impinged by one end of a lever 65 fulcrumed between its ends in the frame $b$ and held bearing against the periphery of the stop collar by a spring 66 so that while shaft $f$ is continuously rotating shaft 56 and the suction device and group of arms 50 remain at a standstill; but occasionally, i. e. when the sheet being operated upon by the dies is about ready to be ejected as scrap, lever 65 momentarily clears the toe on the stop collar so that by the described friction grip between the gear wheel and shaft 56 the latter is rotated, causing the suction device and group of arms 50 to go into action. The movement of the lever to release the stop collar is thus accomplished: Referring to Figs. 10, 11 and 18, 67 is a tappet secured to a moving part of the means which carries the upper die mechanism, as the plunger $d$. In a bracket $b'$ at the lower part of the overhanging portion of the frame $b$ at the left of the dies there is fulcrumed on a vertical axis, as on the headed stud 68, a lever 69 one end of which is adapted to be wiped by the tappet 67 as it rises and falls, the lever thus oscillating against the tension of a spring 70 connecting its other end with the frame. The lower end of lever 65 projects into the plane of movement of lever 69 but is spaced from its outer end (Figs. 10 and 18). In bearings 71 on plate 15 and on an axis parallel with the rack is fulcrumed a feeler lever including a plate 72 and having a forwardly projecting handle 73, the plate having a depending block 74 which may rest on the sheet being advanced and overlies a recess 75 in plate 11, plate 15 being cut away at 76 (Fig. 7) to accommodate the block. The plate portion of said lever is held depressed by one arm of a lever 77 which is fulcrumed to move in a vertical plane on an axis at right angles to the plate-including lever and may slide longitudinally of its axis (Fig. 10) in a bracket 77' and has its other arm normally elevated by a spring 78. So long as a sheet is present lever 77 is held with its spring-engaged arm in the position shown in Figs. 10 and 11. But on absence of a sheet beneath the block 74 the plate-including lever will fall and said arm of lever 77 will be elevated into the space between levers 69 and 65 so that said arm will become a medium for transmitting to lever 65 the motion necessary to release the stop collar upon the tappet 67 descending and actuating lever 69.

At the back of the machine, arranged to slide in brackets 79, is a latch in the form of a bar 80 normally held to the right by a spring 81 and adapted to be manually moved to the left by a lever 82 and also automatically, as will appear. The right-hand end portion of this bar is formed with a notch 83. A detent bar 84 depends from the control lever $j$, being guided for vertical movement in the back of table $m$ and adapted normally to oppose upward movement of the control lever under the tension of its spring $k$ by having the latch 80 engaged in its notch 85 (Fig. 23); but when the latch is moved to the left until by reason of its notch 83 the detent bar is cleared (Fig. 24) the latter and hence the control lever may rise so as to disestablish the clutch and stop the machine. The necessity for automatic shifting of the latch to cause the stopping arises out of the possibility of either an improper delivery of a sheet into the receiver or a sheet jamming or tending to jam while subject to the advancing action of the rack. In bearings 86 on plate 15 is journaled, parallel with the rack, a rock-shaft 87 carrying a pair of arms 88 suitably spaced and having at their forward ends feet 89 which enter suitable recesses formed in the front of said plate 15 and rest on the plate 12, being beveled reversely to the bevel of the latter; one of these arms is extended back of the shaft 87 and has at its rear end the laterally elongated head 90 overlying the arm s of slide r and of a length approximating the latter's range of movement. In ears 91 on the arm s is pivoted a two-armed dog 92 one arm of which underlies the head 90 and the other, which has a tapered end, being held by a spring 93 with its said end normally engaged in a tapered notch 94 in the bar 28. The latch bar carries, suitably secured thereto, a housing 95 in which is arranged a stop pin 96, preferably rearwardly yielding and spring-cushioned and adapted to be impinged laterally by the depending arm of dog 92 if the same is moved against the tension of its spring.

The punched sheet or scrap is ejected as follows: 97 is a bell crank lever normally held by a spring 98 with one arm bearing down upon one arm of a lever 99 whose other arm bears against a cam 100 on the shaft 56, the two levers being fulcrumed in the frame b; the other arm of the lever 97 has pivoted therein a pawl 101 normally held by a spring 102 in about the position shown in Fig. 2—bearing against a pin 103 on lever 97 entering an opening in the pawl. The pawl yields to the advancing sheet, falling into the holes punched therein one after another, but when the ejecting is to occur and lever 99 swings lever 97 to the right, the pawl, then abutting its stop 103, and catching in one of the holes, ejects the sheet.

Operation: The pulley h being in rotation the machine is started by depressing the control lever j (which will be held in the depressed position by latch bar 80, which springs into notch 85 of the detent bar 84 as soon as said notch has registered with the latch bar), whereupon the plungers c d will be reciprocated and the die mechanism will go into action. As for the feeding mechanism—the means to lift and inject the sheets into the receiver—it is obvious that without the lever 65 and the train of parts through which it is actuated from the plunger d said means would at regular intervals and as long as the shaft f continued rotating be actuated by the cams; that is, every certain number of strokes of the plungers to form the product (six in the present instance because the ratio of the gearing 59—58 is one to six) a sheet would be lifted by the feeding means from a stack of sheets placed on the holder and injected into the receiver, to be then fed forward to the dies by the rack z in an obvious manner. The limitations of such an arrangement will be apparent: the length of sheet that could be handled in that case should not exceed the extent of travel which a sheet makes past the dies while the feeding-in means completes one cycle else there will be an overlap of sheets. But with the feeding-in means actuated by means (the rotary driven means including the shaft 56 and the cams and stop collar thereon) which is connected up with the constantly going gear 58 by a friction grip connection, and with the lever 65 and the aforesaid train of parts present, the feeding-in means remains out of action so long as there is a sheet present in process of being advanced and is called into action to introduce another sheet into position to be advanced when the preceding sheet has been advanced a certain distance, say equivalent to its length, however much that may be, thus: Assume that the machine is empty of sheets to be operated upon: then the feeding-in means at regular intervals and as long as gear 58 (or which is the same thing, the plungers d e) continues running will be actuated by the cams, because lever 77 being elevated between lever 65 and the tappet-oscillated lever 69 the lever 65 is intermittently tripped and so will clear the toe on the stop collar each time the toe comes around, when otherwise it would engage the toe and so arrest the cams and consequently the feeding-in means. Next assume that a stack of sheets has been placed in the holder and that the first time thereafter that the feeding-in means operates it deposits the top sheet in the receiver and this sheet is carried forward under block 74 so that lever 77 is withdrawn from between the tappet-oscillated lever 69 and lever 65. The effect of this is by means of the work (i. e. sheet) to disestablish the train of parts whereby from tappet 67 the lever 65 is intermittently moved out of obstructing relation to the rotary structure which actuates the feeding-in means; so that lever 65 remains in position to and does arrest said rotary structure and the feeding-in means hence goes out of action, and it will be observed that it will remain so until the block 74 is again cleared by the sheet (however long it may be) and so allows lever 77 to resume the position where said train of parts is reëstablished. On the sheet clearing block 74 and said train being reëstablished and lever 65 being consequently again moved intermittently and said rotary structure being again released and said feeding-in means consequently again going into action another sheet will be fed into the control of and advanced by the rack, elevating the block 74 and consequently disestablishing said train again, so that the lever 65 again arrests the feeding-in means (and continues to do so so long as the sheet remains beneath the block) the same as before. The cam 53 is so related to the toe on the stop collar (see Fig. 1) that the introduction of a sheet from the stack takes place immediately upon the feeding-in means going into action (that is, immediately upon the rotary structure starting to rotate the lever 47 runs down the incline 53', Fig. 14), and before one cycle of the rotary structure has been completed the sheet thus fed in will reach and elevate block 74 so that the train of parts whereby lever 65 is vibrated from the tappet is disestablished, leaving said lever stationary, prepared to arrest said rotary structure on completion of said cycle. The low part 54' of the cam 54 occupies a following relation to the low part 53' of the cam 53 so that at the completion of one cycle the sheet lifting means, having descended and gripped a sheet, stands elevated holding the sheet opposite the receiver, in position at the beginning of the next cycle for the sheet-injecting means to introduce the sheet into the receiver.

If for any reason the sheet introduced into the receiver is not fully introduced, so that the detecting lever structure comprising parts 87, 88 is held elevated by the sheet and so holds the dog 92 (which is reciprocating with the rack slide $r$ under the head 90 of said lever structure) in lateral opposition to the stop pin 96, said dog in moving toward the stop pin will engage it and shift the detent bar 84 against the tension of its spring and in the direction to release the latch bar, allowing the control lever $j$ to rise and disestablish the clutch, stopping the machine. Again, if the sheet being advanced should offer such resistance (as by a jam) to the rack that part 32 and consequently the dog 92 will slip out of their notches 33 and 94 in the bar 28, but nevertheless due to incidental friction the rack slide should perhaps continue to move with said bar, the dog, being laterally opposite to the stop pin 96, will engage the same and move the detent bar, so that the latch bar is released and the control lever disestablishes the clutch. The stopping may be performed by moving the latch bar by means of the lever 82 or by a handle 80' on the left end of the latch bar.

An important feature of the present invention is the removable die bed $o$. This makes it possible to provide the machine with die beds carrying dies of different diameters and different spacings, so that by easily effected corresponding adjustments as to other parts of the machine, as by substituting a rack $z$ having a certain spacing of its teeth for one having another and by adjusting the throw of the crank 25 by altering the effective radius of the crank 23, which is shown as affording an adjustable connection of the pitman 24 therewith, the machine may be used as a jobbing press.

Having thus fully described my invention, what I claim as new and desire to secure by Letters Patent, is:—

1. In combination, with a frame, two going means having a yieldable power transmitting connection between them, and one driving the other through said connection and including means to advance the sheets one after another, means to feed the sheets one after another to the advancing means operatively connected with and adapted to be driven by the other going means, and means, controlled from the sheet being advanced, for arresting the motion of said other going means.

2. In combination, with a frame, two going means having a yieldable power transmitting connection between them, and one driving the other through said connection and including means to advance the sheets one after another, means to feed the sheets one after another to the advancing means operatively connected with and adapted to be driven by the other going means, means to arrest the motion of said other going means movable into and out of and normally held in position to arrest the motion of the same, and means controlled by the sheet being advanced, to move said arresting means out of said position.

3. In combination, with a frame, two going means having a yieldable power transmitting connection between them, and one driving the other through said connection and including means to advance the sheets one after another, means to feed the sheets one after another to the advancing means operatively connected with and adapted to be driven by the other going means, means to arrest the motion of said other going means movable into and out of and normally held in position to arrest the motion of the same, and means, actuated by the first-named going means and controlled by the sheet being advanced, to move said arresting means out of said position.

4. In combination, with the frame, going means including means to advance the sheets one after another, a driven means having a yielding power-transmitting connection with the first means, means to feed the sheets one after another to the advancing means operatively connected with and adapted to be driven by said driven means, releasable means opposing motion of the driven means, and means, controlled by the advancing sheet, to cause the last-named means to release the driven means.

5. In combination, with the frame, going means including means to advance the sheets one after another, a driven means having a yielding power-transmitting connection with the first means, means to feed the sheets one after another to the advancing means operatively connected with and adapted to be driven by said driven means, releasable means opposing motion of the driven means, and means, actuated by the first-named means, to cause the last-named means to release the driven means.

6. In combination, with the frame, going means including means to advance the sheets one after another, a driven means having a yielding power-transmitting connection with the first means, means to feed the sheets one after another to the advancing means operatively connected with and adapted to be driven by said driven means, releasable means opposing motion of the driven means, controlled by the advancing sheet and actuated by the first-named means, to cause the last-named means to release the driven means.

7. In combination, with a frame, two going means having a slip-friction power transmitting connection between them, and one driving the other through said connection and including means to advance the sheets one after another, means to feed the sheets one after another to the advancing means operatively connected with and adapted to be driven by the other going means, and means, controlled from the sheet being advanced, for arresting the motion of said other going means.

8. In combination, with the frame, going means including means to advance the sheets one after another, a driven means having a slip-friction power-transmitting connection with the first means, means to feed the sheets one after another to the advancing means, operatively connected with and adapted to be driven by said driven means, releasable means opposing motion of the driven means, and means, controlled by the advancing sheet, to cause the last-named means to release the driven means.

9. In combination, with a sheet supporting surface, means to advance a sheet over said surface including a sheet-pushing pawl movable through the sheet plane and adapted to overlap an edge of the sheet, and means to cam the pawl through said plane while pushing the sheet.

10. In combination, with the frame, a yieldable sheet-advancing train, going means to drive the same, a controlling means to the going means, and means, actuable from the yielding sheet-advancing train, to actuate the controlling means.

11. In combination, with the frame, a sheet-advancing train having one of two neighboring parts thereof yieldable to the other under the resistance of the sheet being advanced, going means to drive said train, a controlling means for the going means, and means to transmit movement from said train to the controlling means movable by one of said parts and in the other and thereupon into engagement with the controlling means.

12. In combination, with the frame, a sheet advancer, going means to actuate the sheet advancer, clutch-including means to control the going means movable to either of two positions and normally held in one of them, and a sheet-controlled latch to hold the last-named means in its other position and movable to clear the same.

13. In combination, with the frame, a rectilinearly movable sheet advancer, going means to actuate the sheet advancer, clutch including means to control the going means movable to either of two positions and normally held in one of them, and a sheet-controlled latch to hold the last-named means in its other position and movable substantially parallel with said advancer to clear the last-named means.

In testimony whereof I affix my signature.

AMOS CALLESON.